(12) United States Patent  
Hsu et al.

(10) Patent No.: US 8,248,563 B2  
(45) Date of Patent: Aug. 21, 2012

(54) SYSTEM FOR DISPLAYING IMAGES INCLUDING A LIQUID CRYSTAL DISPLAY PANEL

(75) Inventors: Su-Jung Hsu, Jhunan Township (TW); Shao-Wu Hsu, Hsinchu (TW)

(73) Assignee: Chimei Innolux Corporation, Miao-Li County (TW)

( * ) Notice: Subject to any disclaimer, the term of this patent is extended or adjusted under 35 U.S.C. 154(b) by 1119 days.

(21) Appl. No.: 12/128,887

(22) Filed: May 29, 2008

(65) Prior Publication Data

US 2008/0297710 A1 Dec. 4, 2008

(30) Foreign Application Priority Data

Jun. 1, 2007 (TW) ............................... 96119704 A

(51) Int. Cl.  
*G02F 1/1343* (2006.01)
(52) U.S. Cl. ........................................ 349/139; 349/141
(58) Field of Classification Search .................. 349/110, 349/111, 139, 141  
See application file for complete search history.

(56) References Cited

U.S. PATENT DOCUMENTS

| 6,147,731 | A | 11/2000 | Shibahara |
| 6,160,600 | A * | 12/2000 | Yamazaki et al. ............. 349/138 |
| 6,768,531 | B2 * | 7/2004 | Ochiai et al. ................... 349/141 |
| 6,919,942 | B2 * | 7/2005 | Aoki et al. ..................... 349/111 |

* cited by examiner

*Primary Examiner* — Richard Kim  
*Assistant Examiner* — David Chung  
(74) *Attorney, Agent, or Firm* — Morris Manning & Martin LLP; Tim Tingkang Xia, Esq.

(57) ABSTRACT

A system for displaying images is provided including a liquid crystal display panel. The liquid crystal display panel has a plurality of sub-pixels, each defined between two adjacent data lines extending along a vertical direction and two adjacent scan lines extending along a horizontal direction. The liquid crystal display panel comprises a transparent bottom electrode on the data lines, and a transparent top electrode on the transparent bottom electrode, wherein the transparent top electrode has an extended portion at a corner of the sub-pixel, extending along the horizontal direction to overlap at least a portion of the data line.

19 Claims, 10 Drawing Sheets

SYSTEM FOR DISPLAYING IMAGES INCLUDING A LIQUID CRYSTAL DISPLAY PANEL

FIELD OF THE INVENTION

The invention relates to a system for displaying images including a liquid crystal display panel, and more particularly to a liquid crystal display panel having a new structural design having a transparent top electrode or a transparent bottom electrode.

DESCRIPTION OF THE RELATED ART

Recently, liquid crystal displays have been applied widely to the display element of various products, wherein an in-plane switching (IPS) liquid crystal display and a fringe-field switching (FFS) liquid crystal display are liquid crystal displays with in-plane control and wide viewing angle. The FFS liquid crystal display improves the electrode of the IPS liquid crystal display to enhance transmittance. Although the liquid crystal displays improve viewing angle and increase transmittance however, the areas between sub-pixels of the displays still have light leakage.

Referring to FIG. 1, a cross section of a conventional IPS or FFS liquid crystal display panel is shown. An array substrate 10 has a plurality of data lines 24 thereon. An insulating layer 22 is disposed on the data lines 24. A transparent bottom electrode 20 is disposed on the insulating layer 22 and another insulating layer 18 is disposed on the transparent bottom electrode 20. A transparent top electrode 16 is disposed on the insulating layer 18. A color filter substrate 12 is disposed opposite to the array substrate 10. Then, the color filter substrate 12 and the array substrate 10 sandwich a liquid crystal layer 14 to complete the liquid crystal display panel.

Referring to FIG. 2, a plane view of the transparent top electrode 16 of the conventional IPS or FFS liquid crystal display panel is shown. An upper sub-pixel A is defined between two adjacent data lines DL1, DL2 and two adjacent scan lines SL1, SL2. A lower sub-pixel B is defined between two adjacent data lines DL1, DL2 and two adjacent scan lines SL2, SL3. The transparent top electrodes 16 in the upper sub-pixel A and lower sub-pixel B are independent. The transparent top electrodes 16 consist of a plurality of strips parallel to the data line and are enclosed by two strips perpendicular to the data line. The outside frame of the transparent top electrodes 16 is a rectangle. The transparent bottom electrode 20 in the upper sub-pixel A and lower sub-pixel B is continuous.

Different voltages are applied to the transparent top electrodes 16 of the upper sub-pixel A and lower sub-pixel B respectively, such that the upper sub-pixel A is in a dark state and the lower sub-pixel B is in a bright state. The liquid crystal molecules at the corner areas B1, B2 of the sub-pixel B between the upper sub-pixel A and lower sub-pixel B are reversed due to the electric field effect between the corners of the transparent top electrodes 16 and the transparent bottom electrode 20. Therefore, light leakage is produced at the corner areas B1, B2 with decreased display quality. Referring to FIG. 3, FIG. 3 shows the transmittance of the display versus the relative positions at the sub-pixel B along the dotted line B-B' of FIG. 2. The areas near the corner areas B1, B2 of the sub-pixel B, between the transparent top electrodes 16 and the data lines DL1, DL2 have higher transmittances that represent light leakage produced in the areas.

Referring to FIG. 4, a plane view of the transparent bottom electrode 20 of the conventional IPS or FFS liquid crystal display panel is shown. A left sub-pixel C is defined between two adjacent data lines DL1, DL2 and two adjacent scan lines SL1, SL2. A right sub-pixel D is defined between two adjacent data lines DL2, DL3 and two adjacent scan lines SL1, SL2. The transparent bottom electrodes 20 in the left sub-pixel C and right sub-pixel D are independent.

A driving voltage of positive period is applied to make the left sub-pixel C and right sub-pixel D both in a dark state. Because a positive voltage is applied to the data line DL2, the liquid crystal molecules at the middle area C1 between the left sub-pixel C and right sub-pixel D are still reversed. Therefore, light leakage is produced at the middle area C1. Referring to FIG. 5, FIG. 5 shows the transmittance of the display versus the relative positions at the left sub-pixel C and right sub-pixel D along the dotted line C'-D' of FIG. 4. The area C1 between the transparent bottom electrodes 20 of the left sub-pixel C and right sub-pixel D has a higher transmittance that represents light leakage produced therein.

Therefore, a liquid crystal display panel that overcomes light leakage between sub-pixels is desirable to achieve better display quality.

BRIEF SUMMARY OF THE INVENTION

The invention utilizes a new structural design for a transparent top electrode or a transparent bottom electrode to reduce light leakage between sub-pixels of a liquid crystal display panel, such that contrast of the display can be increased.

An embodiment of the invention provides a system for displaying images including a liquid crystal display panel. The liquid crystal display panel has a plurality of sub-pixels, each defined between two adjacent data lines extending along a vertical direction and two adjacent scan lines extending along a horizontal direction. The liquid crystal display panel comprises an array substrate having the data lines and the scan lines thereon. A transparent bottom electrode is disposed on the data lines and a transparent top electrode is disposed on the transparent bottom electrode, wherein the transparent top electrode has an extended portion at a corner of the sub-pixel, extending along the horizontal direction to overlap at least a portion of the data line.

An embodiment of the invention further provides a system for displaying images including a liquid crystal display panel. The liquid crystal display panel has a plurality of sub-pixels, each defined between two adjacent data lines extending along a vertical direction and two adjacent scan lines extending along a horizontal direction. The liquid crystal display panel comprises an array substrate having the data lines and the scan lines thereon. A first metal layer is disposed between the data lines and the array substrate. The first metal layer includes a plurality of separated portions as a light shielding area. A transparent bottom electrode is disposed on the data lines. A transparent top electrode is disposed on the transparent bottom electrode, wherein the transparent bottom electrode has a connected portion between right and left sub-pixels to cover an unconnected area between the separated portions of the first metal layer.

A detailed description is given in the following embodiments with reference to the accompanying drawings.

BRIEF DESCRIPTION OF THE DRAWINGS

The invention can be more fully understood by reading the subsequent detailed description and examples with reference to the accompanying drawings, wherein.

DETAILED DESCRIPTION OF THE INVENTION

The following description is of the best-contemplated mode of carrying out the invention. The description is provided for illustrating the general principles of the invention and is not meant to be limiting. The scope of the invention is best determined by reference to the appended claims.

A new structural design for a transparent top electrode or a transparent bottom electrode of the invention can be used in wide viewing angle liquid crystal displays such as in-plane switching (IPS) or fringe-field switching (FFS) liquid crystal displays. Light leakage between sub-pixels of the liquid crystal displays can be reduced by the structural design improvement of the transparent top electrode or the transparent bottom electrode to increase contrast of the displays.

Figure 6:
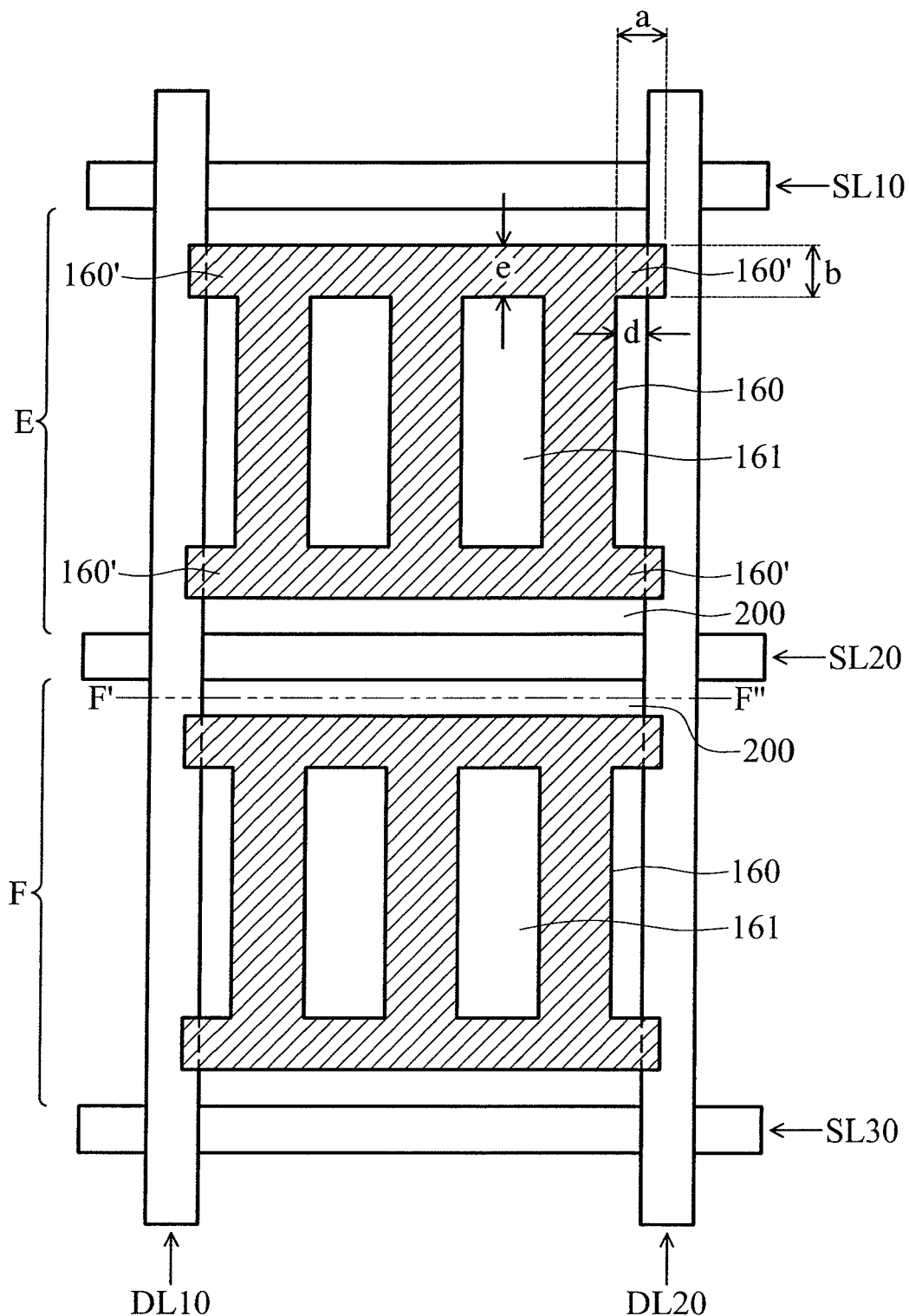
FIG. 6 is a schematic plane view of a transparent top electrode of a liquid crystal display panel according to an embodiment of the invention.

Referring to FIG. 6, it is a schematic plane view of the transparent top electrode of the liquid crystal display panel according to an embodiment of the invention, wherein an upper sub-pixel E and a lower sub-pixel F are shown. The upper sub-pixel E is defined between two adjacent data lines DL10, DL20 extending along a vertical direction and two adjacent scan lines SL10, SL20 extending along a horizontal direction. The lower sub-pixel F is defined between two adjacent data lines DL10, DL20 and two adjacent scan lines SL20, SL30. The transparent top electrodes 160 at the sub-pixels E, F are independent and each transparent top electrode comprises a plurality of slits 161 parallel to the data line. Although the transparent top electrode 160 as shown in FIG. 6 has two slits, one skilled in the art can appreciate that the transparent top electrode 160 can also include one or more than two slits. The size of slit and the distance between the slits can also be adjusted. The material of the transparent top electrodes 160 is such as indium tin oxide (ITO) or indium zinc oxide (IZO).

In an exemplary embodiment of the invention, the transparent top electrode 160 has extended portions 160' at four corners of the sub-pixel. The extended portion 160' is extended along the horizontal direction to overlap at least a portion of the data lines DL10, DL20. The shape of the extended portion 160' may be a rectangle or the other shapes. The width a, i.e., short side of the extended portion 160' is slightly greater than the distance d between the edge of the transparent top electrode 160 and the data line. The length b, i.e., long side of the extended portion 160' is substantially equal to the width e of the strip of the transparent top electrode 160 perpendicular to the data line. In an embodiment of the invention, the width of the data lines DL10, DL20 is about 6 μm. The distance d between the edge of the transparent top electrode 160 and the data line is smaller than about 2 μm. The width a of the extended portion 160' of the transparent top electrode 160 is about 2 μm and the length b thereof is about 3.5 μm.

Figure 1:
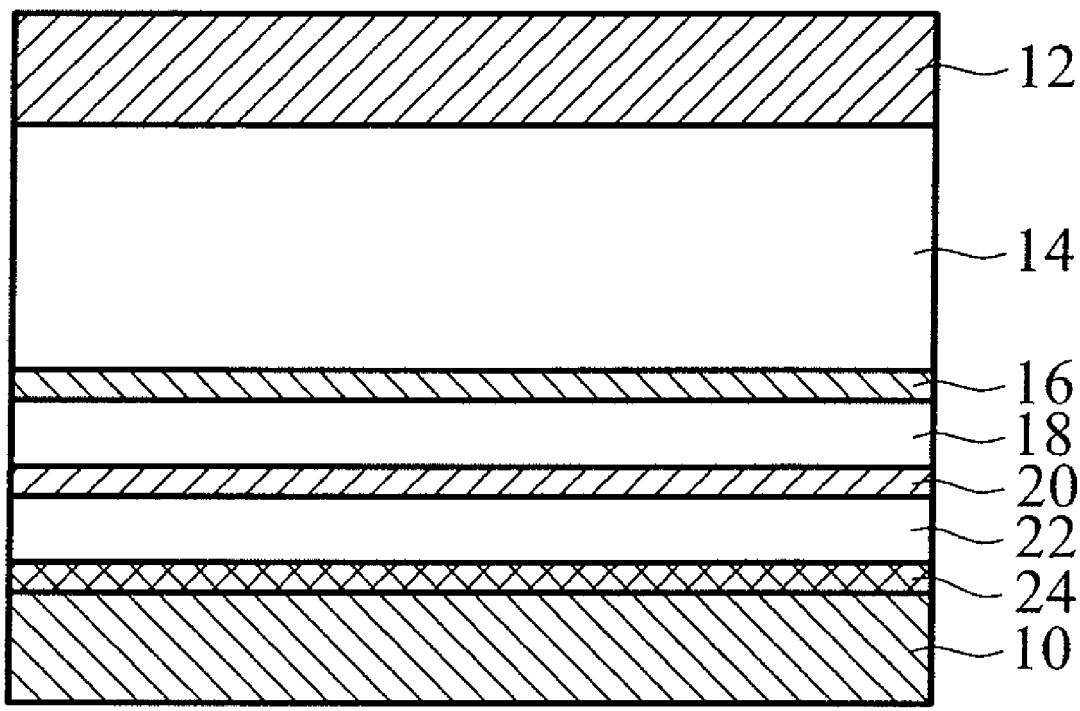
FIG. 1 is a schematic cross section of a conventional liquid crystal display panel.
Figure 4:
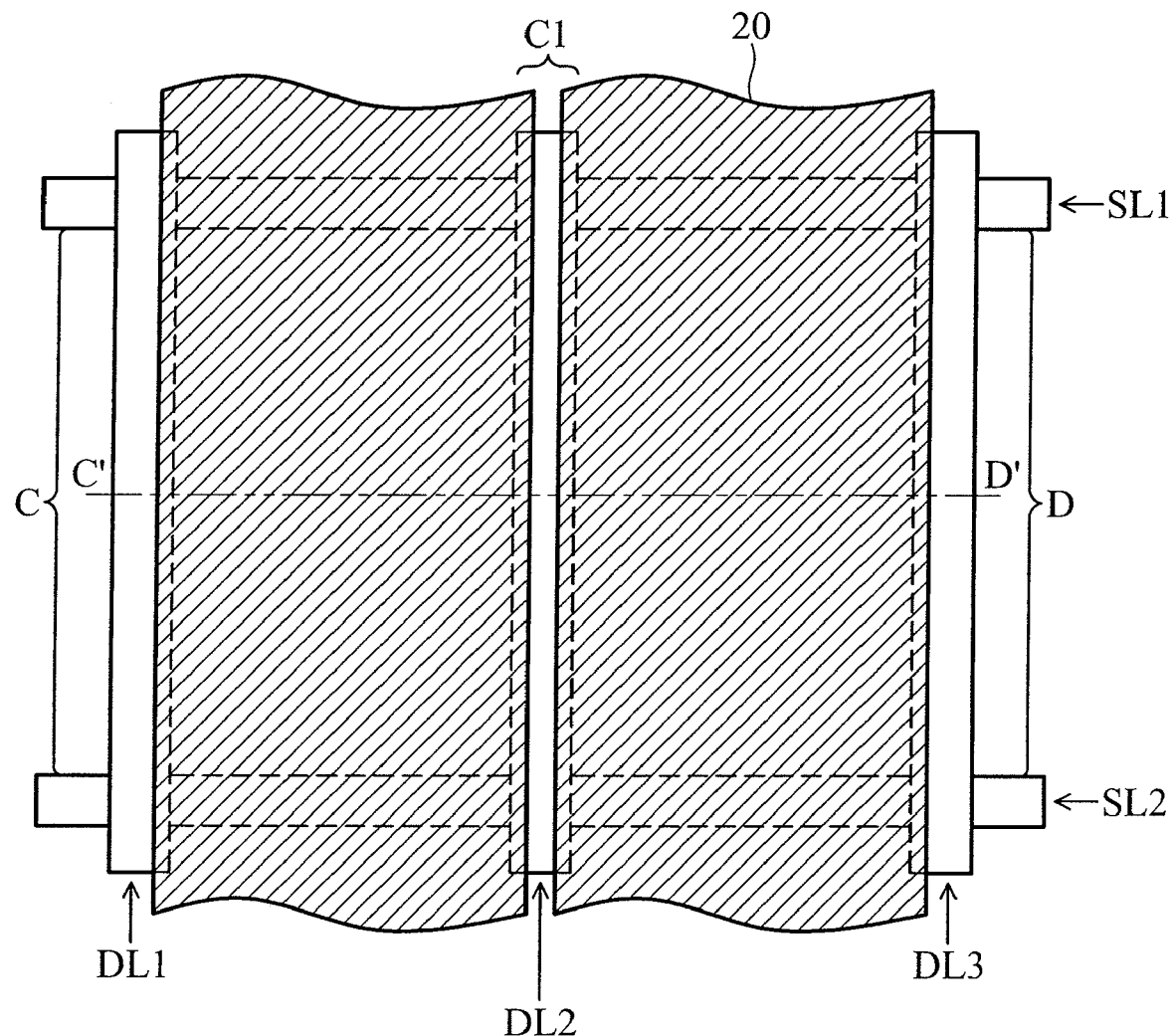
FIG. 4 is a schematic plane view of a transparent bottom electrode of the conventional liquid crystal display.
Figure 5:
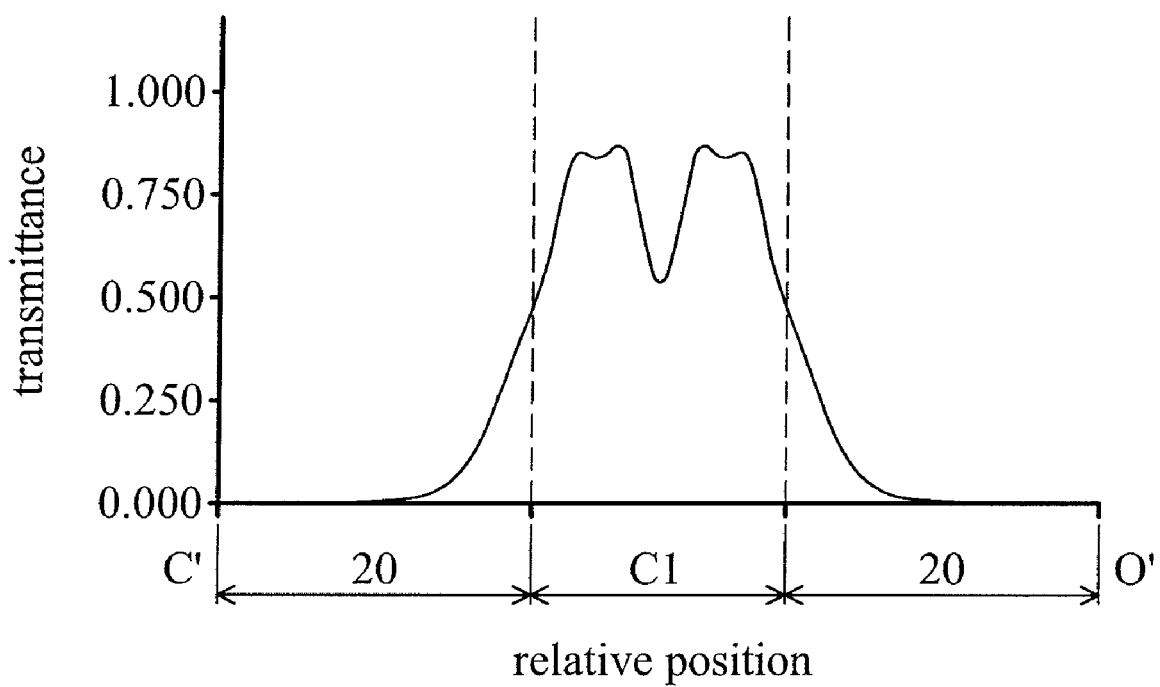
FIG. 5 shows the transmittance versus relative positions in the sub-pixels along the dotted line C'-D' of FIG. 4.

The transparent bottom electrode 200 in the sub-pixels E, F can be a strip continuously disposed at the upper and lower sub-pixels (as shown in FIG. 4) and has a width substantially equal to the width of sub-pixel or the other designs. Moreover, a first insulating layer can be disposed between the data lines and the transparent bottom electrode. The first insulating layer is similar to the insulating layer 22 of FIG. 1. The data lines are disposed under the transparent bottom electrode. A second insulating layer can be disposed between the transparent top electrode and the transparent bottom electrode. The second insulating layer is similar to the insulating layer 18 of FIG. 1. The transparent bottom electrode is disposed under the transparent top electrode. The material of the first and second insulating layers is such as silicon nitride and the thickness thereof is about 2000 Å.

In an embodiment of the invention, the liquid crystal display panel can be driven at a condition, for example, driving voltage of the transparent top electrode 160 at the upper sub-pixel E is 0.3V, driving voltage of the transparent top electrode 160 at the lower sub-pixel F is 4.5V, driving voltage of the transparent bottom electrode 200 is 0V, driving voltage of the data line DL10 is 0V, and driving voltage of the data line DL20 is 5V, such that the upper sub-pixel E can be in a dark state and the lower sub-pixel F can be in a bright state. Because the transparent top electrode 160 has the extended portions 160' at the corners of the sub-pixel, extending along the horizontal direction to overlap at least a portion of the data line, the liquid crystal reverse areas produced by the electric field effect are covered with the data lines.

Figure 7:
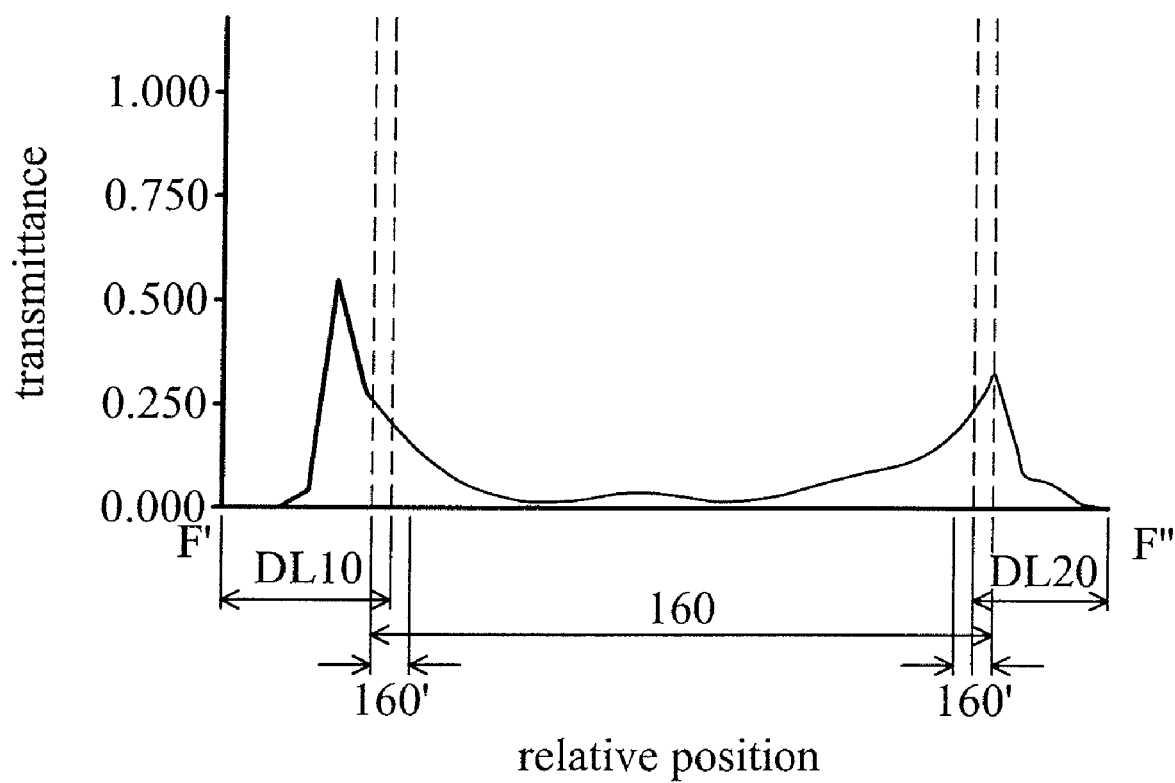
FIG. 7 shows the transmittance versus relative positions in the sub-pixel along the dotted line F'-F''' of FIG. 6.

Referring to FIG. 7, the transmittances versus relative positions in the sub-pixel F along the dotted line F'-F''' of FIG. 6 is shown. In an embodiment of the invention, the transparent top electrode 160 has the extended portions 160' near the corners of the sub-pixel F to overlap at least a portion of the data line, such that the liquid crystal reverse areas, i.e., the areas with higher transmittances, are shifted to the areas with the data lines therein. The data line is usually formed from metal material which has light shielding effect. Moreover, in the liquid crystal display, the data line is disposed under the transparent top electrode such that the data lines can shield off light from the backlight. Therefore, in the liquid crystal display according to an embodiment of the invention, light leakage between the upper and lower sub-pixels produced by liquid crystal molecules reversing can be covered to enhance the contrast of the display.

Figure 8:
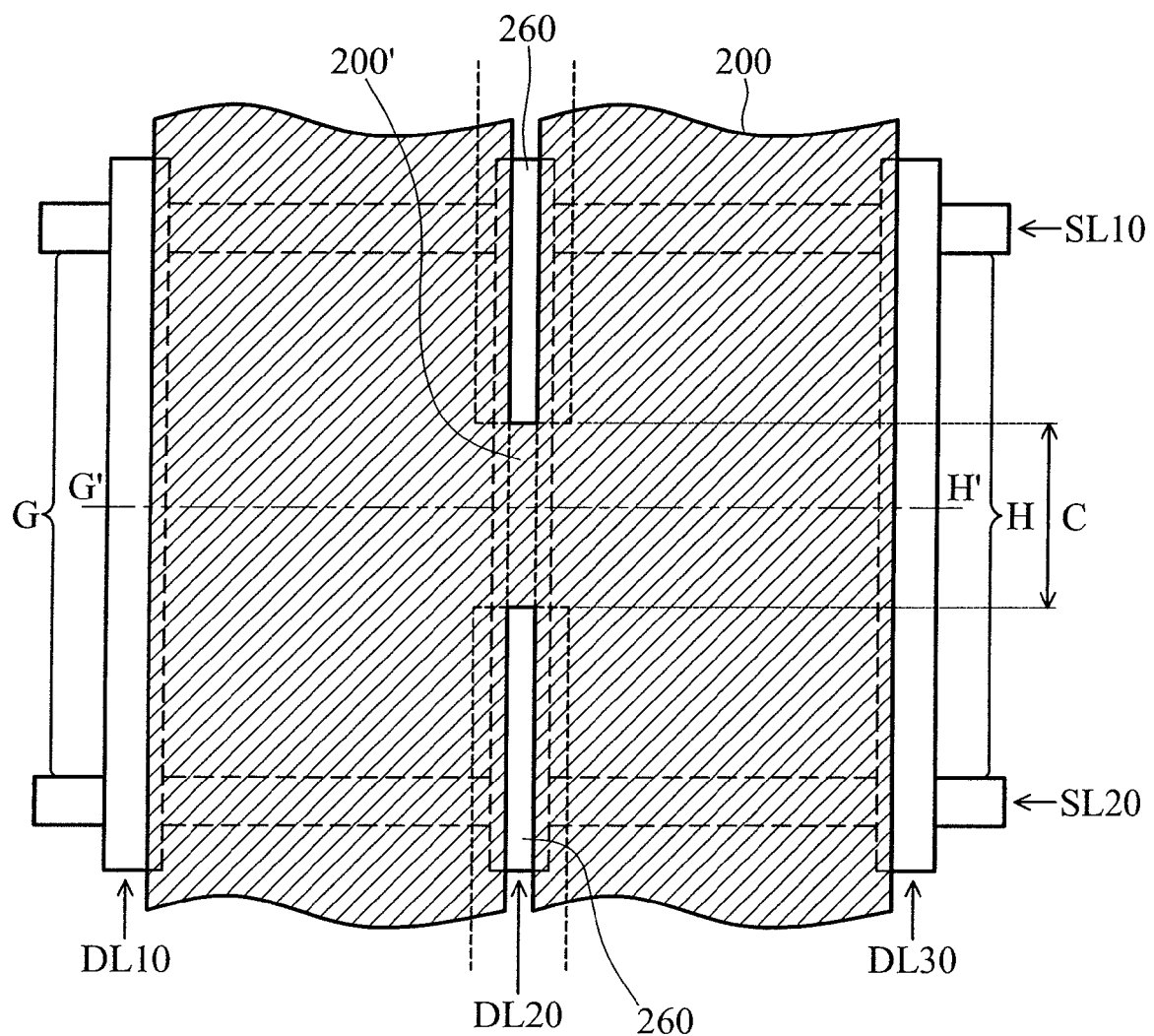
FIG. 8 is a schematic plane view of a transparent bottom electrode of a liquid crystal display panel according to an embodiment of the invention.

Referring to FIG. 8, a schematic plane view of the transparent bottom electrode of the liquid crystal display panel according to an embodiment of the invention is shown. A left sub-pixel G is defined between two adjacent data lines DL10, DL20 extending along a vertical direction and two adjacent scan lines SL10, SL20 extending along a horizontal direction. A right sub-pixel H is defined between two adjacent data lines DL20, DL30 and two adjacent scan lines SL10, SL20.

In the liquid crystal display panel, a first metal layer 260 can be disposed under the data lines. At some areas of the display panel, the first metal layer is as gate line and a voltage is applied to the first metal layer. At other areas of the display panel, the first metal layer has a function of light shielding and no voltage is applied to the first metal layer, i.e., the voltage applied to the first metal layer is floating. At further other areas of the display panel, a common voltage (Vcom) is applied to the first metal layer for connecting to the transparent bottom electrode, i.e., bottom ITO. When the display panel is driven, the first metal layer at the different areas require different voltages, therefore the first metal layer must include a plurality of separated portions. Some of the separated portions can be light shielding areas, but the unconnected areas between the separated portions of the first metal layer can not cover light leakage.

In an exemplary embodiment of the invention, the transparent bottom electrode 200 has a connected portion 200' between the right and left sub-pixels G, H. The connected portion 200' covers the unconnected areas between the separated portions of the first metal layer. The connected portion 200' has a length c, i.e., long side smaller than about third of the length of sub-pixel. In one embodiment of the invention, the connected portion 200' of the transparent bottom electrode 200 has a length c about 6 μm and a width about 4 μm. The material of the transparent bottom electrode 200 is such as indium tin oxide (ITO) or indium zinc oxide (IZO).

Figure 2:
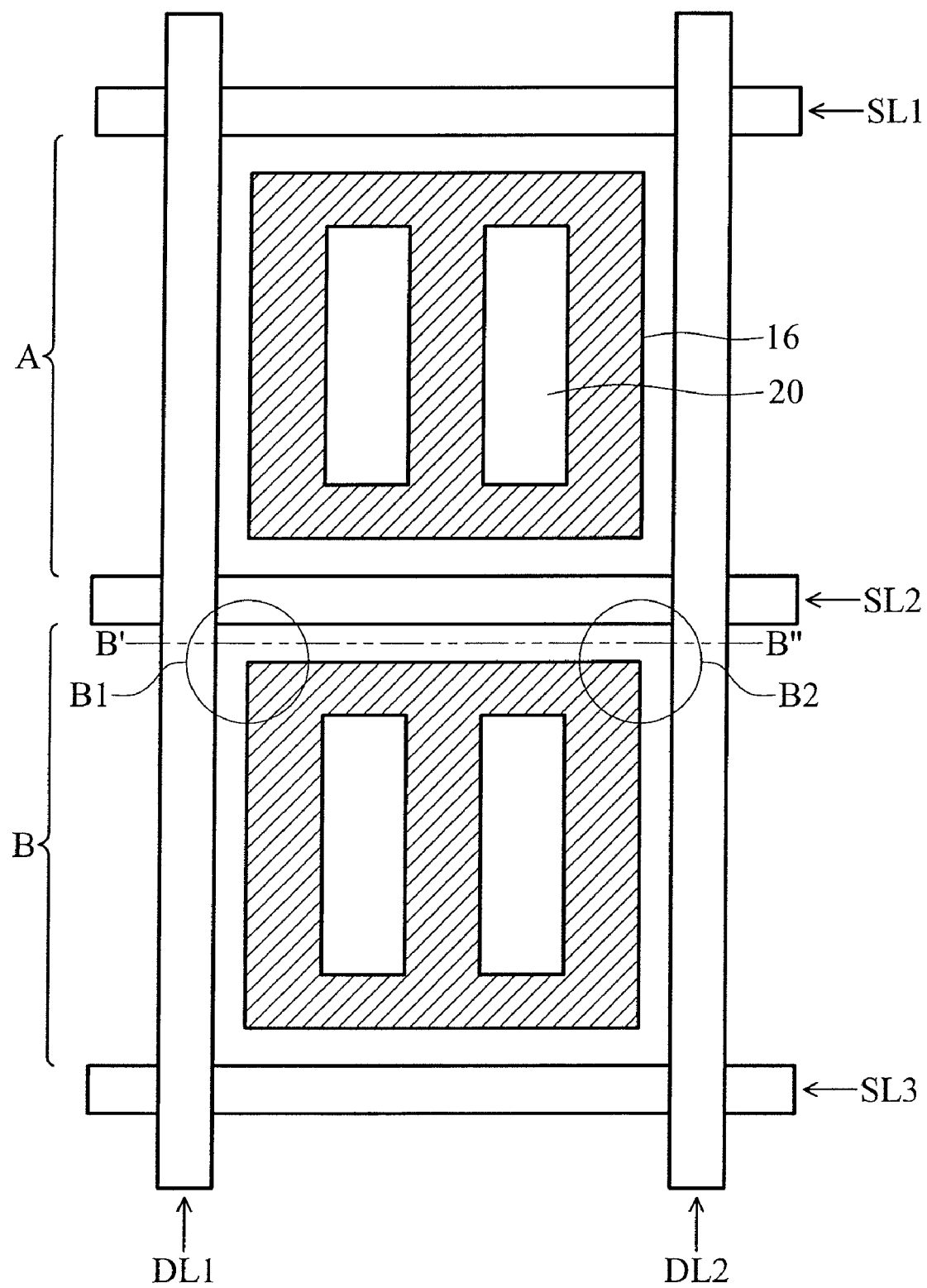
FIG. 2 is a schematic plane view of a transparent top electrode of the conventional liquid crystal display.
Figure 3:
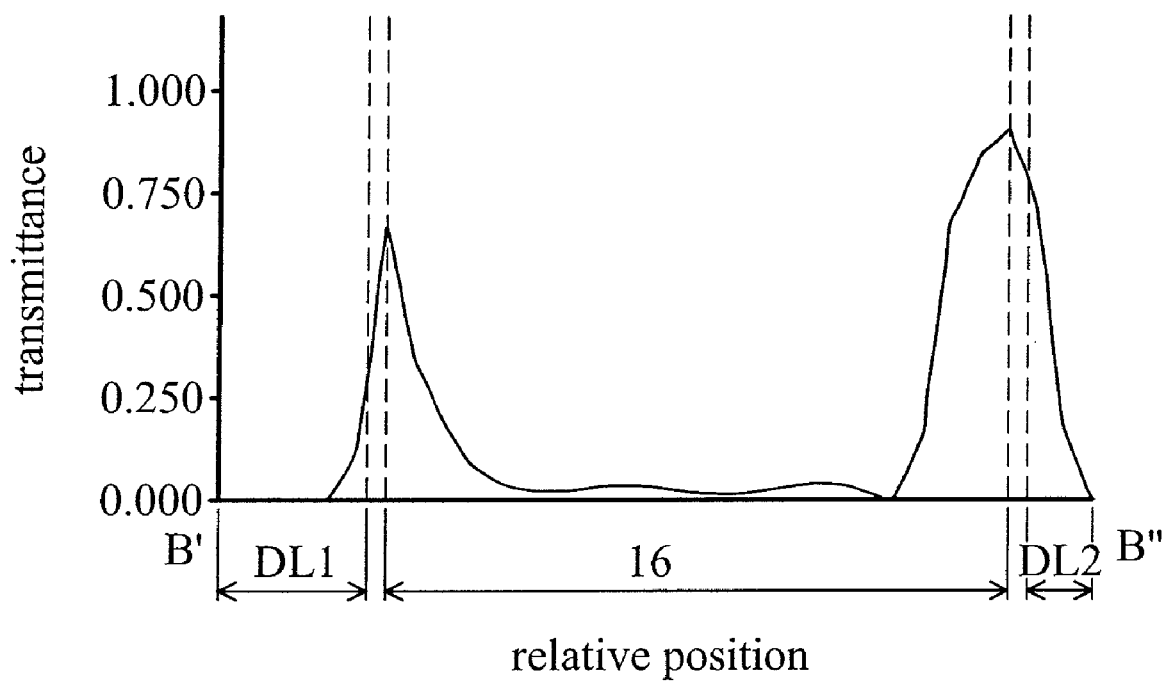
FIG. 3 shows the transmittance versus relative positions in the sub-pixel along the dotted line B-B' of FIG. 2.

In an embodiment of the invention, the previously described transparent bottom electrode can be combined with the transparent top electrode of FIG. 6 for the display, wherein the transparent top electrode has extended portions at four corners of the sub-pixel and the extended portions are extending along the horizontal direction to overlap at least a portion of the data line. In another embodiment of the invention, the previously described transparent bottom electrode can be combined with the transparent top electrode with a shape of FIG. 2.

In an embodiment of the invention, the liquid crystal display panel can be driven, for example, by using a positive wave period driving circuit. The driving conditions may be as follows. For example, the transparent top electrode 160 of the left and right sub-pixels G, H has a driving voltage of 0.3V, the transparent bottom electrode 200 of the left and right sub-pixels G, H has a driving voltage of 0V, and the data line DL20 has a driving voltage of 5V, such that the left and right sub-pixels G, H are both in dark states. Because the data line DL20 has a driving voltage of 5V, the liquid crystal molecules at the areas between the left and right sub-pixels G, H are reversed due to the electric field and light leakage is produced at these areas. Although some of the light leakage areas can be covered with the first metal layer 260, the unconnected areas of the first metal layer can not cover the light leakage. An embodiment of the invention uses the connected portions 200' of the transparent bottom electrode 200 between the left and right sub-pixels to not reverse the liquid crystal molecules at the areas of the connected portions 200', such that no light leakage is produced at the areas between the left and right sub-pixels.

Figure 9:
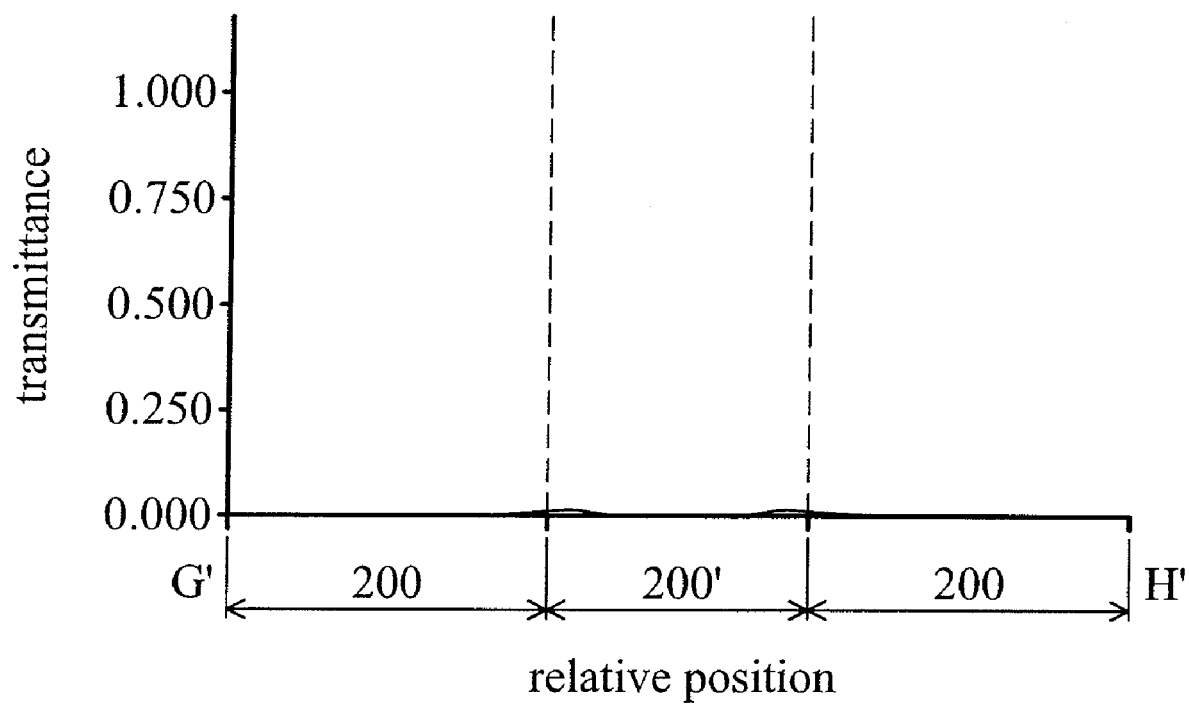
FIG. 9 shows the transmittance versus relative positions in the sub-pixels along the dotted line G'-H' of FIG. 8.

Referring to FIG. 9, transmittances versus relative positions in the left and right sub-pixels G, H along the dotted line G'-H' of FIG. 8 is shown. As shown, there is no higher transmittance at the area between the left and right sub-pixels G, H with the connected portions 200' of the transparent bottom electrode 200 therein, which represents no light leakage is produced in the area.

Moreover, the transparent bottom electrode 200 has the connected portions 200' between the left and right sub-pixels G, H such that the transparent bottom electrode 200 has the shape of a network to reduce the impedance of the common voltage (Vcom) thereof.

Compared with the conventional liquid crystal display panel, the improved structure of the transparent bottom or top electrode of the display panel of the invention can reduce light leakage between the upper and lower sub-pixels or light leakage between the left and right sub-pixels to achieve higher display contrast.

In order to complete the fabrication of the liquid crystal display, one skilled in the art can appreciate that according to conventional methods, a pair of polarizers also sandwich the liquid crystal display panel and a backlight device disposed is under the lower polarizer. In an embodiment of the invention, the angle between the rubbing direction of liquid crystal molecules and the direction of data line, i.e., the vertical direction, is about seven degrees. The rubbing angle diverges from the vertical direction about seven degrees. The direction of the absorption axis of the lower polarizer is the same with the rubbing direction and the direction of the absorption axis of the upper polarizer is perpendicular to the direction of absorption axis of the lower polarizer, such that the liquid crystal display panel can be a normally black mode.

The aforementioned embodiments are illustrated with an IPS or FFS liquid crystal display as an example, but it is not limited to. The liquid crystal display of the invention can also be used in other types of liquid crystal displays.

Figure 10:
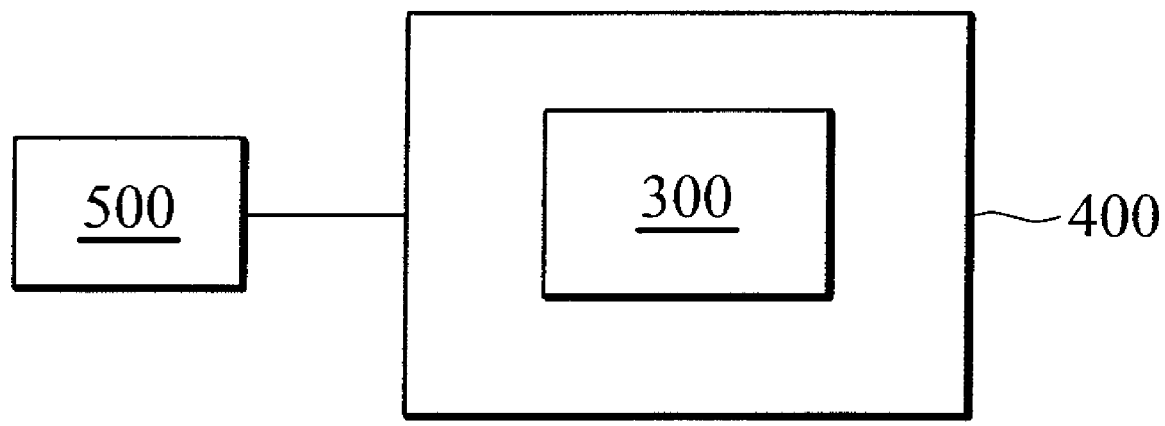
FIG. 10 schematically shows a system for displaying images including the liquid crystal display panel according to an embodiment of the invention.

Referring to FIG. 10, FIG. 10 shows a system 600 for displaying images including the liquid crystal display panel according to the various embodiments of the invention. The system 600 comprises a liquid crystal display 400, and the liquid crystal display 400 comprises the liquid crystal display panel 300 according to the various embodiments of the invention, a pair of polarizers sandwiching the liquid crystal display panel 300, and a backlight device disposed under the lower polarizer. The liquid crystal display 400 can be a part of an electronic device. In general, the system 600 for displaying images comprises the liquid crystal display 400 and an input unit 500. The input unit 500 is coupled to the liquid crystal display 400 and operative to provide input to the liquid crystal display such that the liquid crystal display displays images. The system 600 for displaying images can be a mobile phone, digital camera, personal digital assistant (PDA), notebook computer, desktop computer, television, car display or portable DVD player.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A system for displaying images, comprising:
  a liquid crystal display panel, having a plurality of sub-pixels, each sub-pixel defined between two adjacent data lines extending along a vertical direction and two adjacent scan lines extending along a horizontal direction, wherein the liquid crystal display panel comprises:
  an array substrate, having the data lines and the scan lines thereon;
  a transparent bottom electrode disposed on the data lines; and
  a transparent top electrode disposed on the transparent bottom electrode,
  wherein the transparent top electrode has an extended portion at a corner of the sub-pixel, extending along the horizontal direction to overlap at least a portion of the data line, and the transparent top electrodes at each sub-pixel are physically isolated from each other.

2. The system as claimed in claim 1, wherein the transparent top electrode comprises a plurality of slits paralleled to the data line.

3. The system as claimed in claim 1, wherein the extended portion of the transparent top electrode comprises a rectangle.

4. The system as claimed in claim 1, wherein the transparent top electrode comprises indium tin oxide (ITO) or indium zinc oxide (IZO).

5. The system as claimed in claim 1, wherein the extended portion of the transparent top electrode makes a liquid crystal reversing area at the corner of the sub-pixel to be covered with the data line.

6. The system as claimed in claim 1, further comprising a first insulating layer disposed between the data line and the transparent bottom electrode.

7. The system as claimed in claim 1, further comprising a second insulating layer disposed between the transparent top electrode and the transparent bottom electrode.

8. The system as claimed in claim 1, further comprising a liquid crystal display, wherein the liquid crystal display comprises:
    the liquid crystal display panel;
    a pair of polarizers sandwiching the liquid crystal display panel; and
    a backlight device disposed under the pair of polarizers and the liquid crystal display panel.

9. The system as claimed in claim 8, wherein the liquid crystal display comprises an in-plane switching (IPS) liquid crystal display or a fringe-field switching (FFS) liquid crystal display.

10. The system as claimed in claim 8, further comprising an electronic device, wherein the electronic device comprises:
    the liquid crystal display; and
    an input unit coupled to the liquid crystal display to provide input to the liquid crystal display such that the liquid crystal display displays images.

11. The system as claimed in claim 10, wherein the electronic device is a mobile phone, digital camera, personal digital assistant (PDA), notebook computer, desktop computer, television, car display or portable DVD player.

12. A system for displaying images, comprising:
    a liquid crystal display panel, having a plurality of sub-pixels, each sub-pixel defined between two adjacent data lines extending along a vertical direction and two adjacent scan lines extending along a horizontal direction, wherein the liquid crystal display panel comprises:
    an array substrate, having the data lines and the scan lines thereon;
    a first metal layer disposed between the data lines and the array substrate, including a plurality of separated portions as a light shielding area;
    a transparent bottom electrode disposed on the data lines; and
    a transparent top electrode disposed on the transparent bottom electrode,
    wherein the transparent bottom electrode has an connected portion between a right and a left sub-pixels to cover an unconnected area between the separated portions of the first metal layer, and the connected portion has a length smaller than a third of a length of the sub-pixel along the direction of the data line.

13. The system as claimed in claim 12, wherein the transparent bottom electrode has a network structure.

14. The system as claimed in claim 13, wherein the network structure of the transparent bottom electrode reduces impedance of common voltage (Vcom) of the transparent bottom electrode.

15. The system as claimed in claim 12, wherein the transparent bottom electrode comprises indium tin oxide (ITO) or indium zinc oxide (IZO).

16. The system as claimed in claim 12, further comprising a liquid crystal display, wherein the liquid crystal display comprises:
    the liquid crystal display panel;
    a pair of polarizers sandwiching the liquid crystal display panel; and
    a backlight device disposed under the pair of polarizers and the liquid crystal display panel.

17. The system as claimed in claim 16, wherein the liquid crystal display comprises an in-plane switching (IPS) liquid crystal display or a fringe-field switching (FFS) liquid crystal display.

18. The system as claimed in claim 16, further comprising an electronic device, wherein the electronic device comprises:
    the liquid crystal display; and
    an input unit coupled to the liquid crystal display to provide input to the liquid crystal display such that the liquid crystal display displays images.

19. The system as claimed in claim 18, wherein the electronic device is a mobile phone, digital camera, personal digital assistant (PDA), notebook computer, desktop computer, television, car display or portable DVD player.

* * * * *